Oct. 4, 1938.   R. W. ERDLE   2,131,941
DENTURE
Filed Jan. 20, 1936

Inventor:
Reiner W. Erdle.
By Brown, Jackson, Boettcher & Dienner
Attys.

Patented Oct. 4, 1938

2,131,941

UNITED STATES PATENT OFFICE 2,131,941

DENTURE

Reiner W. Erdle, Chicago, Ill., assignor to Dental Research Corporation, a corporation of Illinois Application January 20, 1936, Serial No. 59,818

6 Claims. (Cl. 32—2)

This invention relates to dentures, and has to do with dental plates.

One of the objects of the invention is to produce, at relatively low cost, a light weight porcelain plate, either partial or full, with a lining or layer of binding material which will hold the plate together in the event of fracture of the porcelain part of the plate.

In one embodiment of the invention, the plate comprises a layer of porcelain and a layer of binding material applied and joined to the lingual or palatal side of the porcelain layer.

In another embodiment of the invention, the plate comprises two layers of porcelain with a layer of binding material disposed between and uniting the two layers of porcelain.

Figure 1:
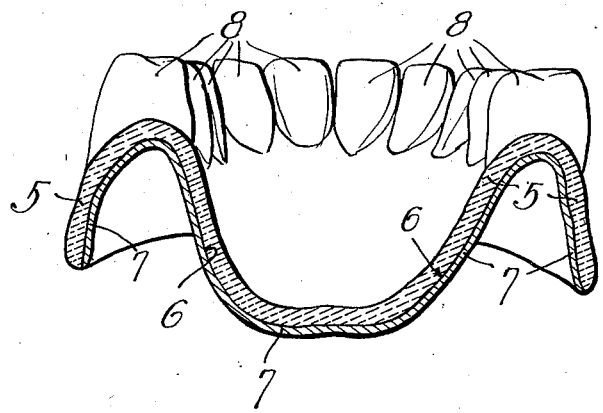
Figure 2:
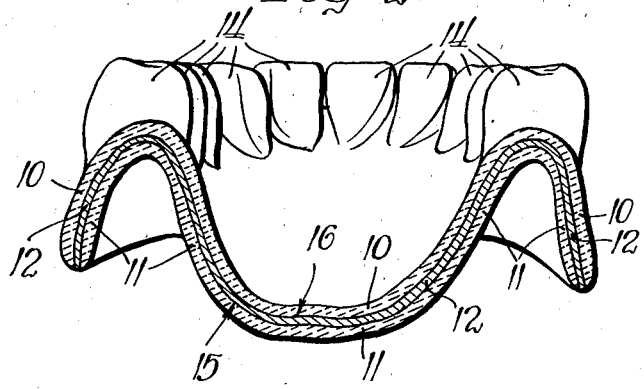

Further objects and advantages of the invention will be apparent from the following detailed description taken in connection with the accompanying drawing, in which:

Figure 1 is a sectional view through a full upper denture embodying the present invention; and Figure 2 is a similar view through another embodiment of the invention.

Referring to the drawing, the denture shown in Figure 1 comprises a light weight porcelain plate 5 having applied and joined to the side 6 thereof a lining or layer of binding material 7, which layer of binding material 7 is effective to hold the plate together in the event of fracture of the porcelain layer 5. This layer 7 of binding material may be a layer of Celluloid joined to the porcelain layer 5 by cementing or otherwise securing it thereto by means of heat and pressure, causing the surfaces to be forced into intimate contact so that they will adhere, or by flowing it over the surface 6 of the porcelain layer 5 and allowing it to set and unite with the porcelain layer.

The porcelain layer 5, which is shaped to fit within and conform with the mouth, has porcelain teeth 8 which may be either stock teeth to which the plate 5 is molded, or teeth molded in one piece with the plate or layer 5.

The porcelain plate is made by adapting a wax pattern to a model and then setting up and articulating the teeth on the wax pattern. As above explained, the teeth may be stock teeth formed of porcelain, or wax teeth may be used to form the porcelain teeth as a unitary part of the porcelain plate 5.

The wax pattern is attached to a sprue which is large enough to hold the amount of porcelain required to fill the mold. The sprue and wax pattern are coated with a material which will not combine with the fused porcelain and which, at the same time, will give the mold cavity a smooth finish. One satisfactory material may be formed by mixing powdered flint with a mixture of 50% of silicate of soda diluted 10:1 and 50% of a mixture of diluted di-glycol stearate. To 100 c. c. of this paste is added 1 c. c. of hydrochloric acid to effect the setting of this paste. This paste is sprayed to, or otherwise applied as a coating on the wax pattern. Potassium carbonate may be used with this material up to 10% with desired results. When this coating is applied the water evaporates and leaves a coating which will not combine with the fused porcelain, and which, at the same time, gives the mold cavity a smooth finish which cannot be obtained with the rough outer investment material. It is thought that this coating absorbs the tetra-ethyl binder of the investment material when the investment material set forth in my copending application Serial No. 48,071, filed November 4, 1935, is employed.

Instead of making this coating of the material above described, it may be made by mixing about ten to twenty parts water to one part silicate of soda and powdered flint to make a paste that may be sprayed upon the pattern or otherwise applied as a coating thereto as by painting the same on the pattern, or it may comprise a hydrolyzed solution composed of tetra-ethyl silicate approximately 50%, alcohol approximately 40%, and water approximately 10%. The actual procedure of hydrolyzing the tetra-ethyl silicate is generally as follows: First take the fifty parts by volume of tetra-ethyl silicate, add the forty parts of alcohol, and shake thoroughly. Then add the ten parts by volume of water slightly acidulated with approximately .007% hydrochloric acid. Powdered flint and asbestos are also added to make a paste that may be sprayed or otherwise applied. The definite percentages may, of course, vary widely within the scope of the present invention.

In making up the coating, clay or any other highly refractory material which will not combine with the fused porcelain and which is finer than the rough outer investment material may be used with or in lieu of the flint content of the coating.

The coated pattern with the teeth set therein is then invested in an investment ring in a way that the sprue end stands out of the investment. Several investments may be used as set forth in my copending application above identified.

After the investment is set the wax is eliminated by heating. The porcelain, in powder or rock form, is inserted in the opening left by the sprue. The mold is then placed in the furnace, the heat is raised to the flow point of the porcelain, and preferably to a temperature below the normal fusing point of the porcelain as more fully set forth in my copending application Serial No. 59,816, filed January 20, 1936, and simultaneously with the application of such heat the porcelain is pressed slowly and continuously into the mold cavity to fill said cavity, all as more fully described in my above identified copending application. The pressure may be applied by means of a refractory plug pushed down by a metal or refractory rod. After all of the porcelain is pressed into the mold cavity the mold is permitted to cool, the refractory material is removed, and the plate may be colored to suit requirements, as, for example, by a coating of porcelain pink enamel. If the teeth 8 are molded as a unitary part of the porcelain plate or layer 5, they may be stained to the desired shades.

Instead of placing all of the porcelain in the gate and filling the mold by pressing the porcelain from the gate into the mold cavity, it is possible to do it somewhat differently, namely, to grind up the porcelain to fairly fine fragments, make a paste of it with water or alcohol, and then to vibrate it down into the mold cavity so as substantially to fill it. Additional porcelain is placed in the gate. The whole assembly is placed in the furnace and the procedure from then on is as above described. The difference is that only the amount of porcelain necessary to complete the filling of the mold cavity is fed in from the gate by the process previously described.

The layer 7 of binding material may be formed to conform with the side 6 of the porcelain layer 5, and vulcanized thereto after finishing the porcelain layer with its teeth 8, as by means of heat and pressure, or the layer of binding material may be produced by flowing the binding material over the surface 6 and allowing it to set and unite with the porcelain layer. The layer 7 of binding material covers the side 6 of the porcelain layer or plate part 5 and holds the porcelain together in the event of fracture thereof, and at the same time the resulting plate is light weight and may be produced at low cost.

In the embodiment shown in Figure 2, the plate comprises two layers, 10 and 11, of porcelain, with a layer 12 of binding material disposed between and uniting the two layers of porcelain.

The porcelain layer 10 has porcelain teeth 14 which may be either stock teeth to which the layer 10 is molded, or teeth molded in one piece with the layer 10.

The porcelain layer 10 is made in the manner set forth in connection with two making of the porcelain layer or plate part 5 of the preceding embodiment of the invention, and the second porcelain layer 11 is made in a similar manner with the side 15 thereof shaped to conform with the side 16 of the porcelain layer 10. The layer 12 of binding material, which may be a layer of Celluloid as described in connection with the preceding embodiment of the invention, may be swaged to conform with the sides 15 and 16 of the porcelain layers 10 and 11 and vulcanized therebetween by heat and pressure, thereby uniting the layers 10, 11 and 12 to form a unitary laminated structure in which the intermediate layer 12 is effective to hold the porcelain plate parts together in the event of fracture thereof. Instead of making the layer of binding material 12 and swaging the same to conform with the side 15 and 16 of the porcelain layers, the layer 12 may be formed by following the binding material between the porcelain layers and allowing the same to set and unite therewith.

The plate shown in Figure 2 is light weight and may be produced at low cost, and produces a sanitary mouth condition with the layer of Celluloid or other binding material covered against exposure to the mouth tissue by the porcelain layer 11. The porcelain is a sanitary material and can be molded and colored to give it the desired appearance, and the layer of binding material is effective to hold the parts together as above set forth.

The layer 7 of Figure 1 and the layer 12 of Figure 2 may be formed of other substances than Celluloid within the scope of the present invention. For example, vulcanized dental rubber may be employed instead of Celluloid. Numerous other materials are also proposed—for example, a layer of fine wire mesh in combination with "Bakelite" cement or a layer of glyptol. The use of fibrous material, like silk fiber or fabric, or metal fiber, like stainless steel wool and a binder of "Bakelite" resin or other synthetic resins or vulcanite instead of Celluloid is also contemplated.

I do not intend to be limited to the precise details shown or described.

I claim:

1. As a new article of manufacture, a dental plate comprising a layer of porcelain and a preformed plate of Celluloid covering and joined to one side of said porcelain layer and effective to hold the porcelain layer together in the event of fracture thereof.

2. As a new article of manufacture, a dental plate comprising a layer of porcelain, a preformed layer of binding material covering and joined to one side of said porcelain layer independently of the formation of said porcelain layer and effective to hold the same together in the event of fracture, and a porcelain tooth part joined to said porcelain plate.

3. As a new article of manufacture, a dental plate comprising two layers of porcelain and a preformed layer of binding material interposed between said layers of porcelain, said layer of binding material securing the layers of porcelain together and effective to hold the plate together in the event of fracture of the porcelain layers.

4. As a new article of manufacture, a dental plate comprising two layers of porcelain, a preformed layer of binding material formed independently of said layers of porcelain and having its opposite surfaces conforming to the adjacent surfaces of said layers of porcelain and interposed between said layers of porcelain, said layer of binding material securing the layers of porcelain together and effective to hold the plate together in the event of fracture of the porcelain layers, said plate being shaped to fit within the mouth, and a porcelain tooth part formed as a unitary part of one of said porcelain layers.

5. As a new article of manufacture, a dental plate comprising two layers of porcelain and a preformed layer of Celluloid between said layers of porcelain, said layer of Celluloid securing the layers of porcelain together and effective to hold the porcelain layers together in the event of fracture thereof.

6. As a new article of manufacture, a dental plate comprising two preformed layers of porcelain and an independent layer of binding material disposed between said layers of porcelain and securing the layers of porcelain together and effective to hold the plate together in the event of fracture of the porcelain layers.

REINER W. ERDLE.